Jan. 30, 1940.  L. B. KIMBRELL  2,188,838
LIFTING JACK
Filed June 20, 1939
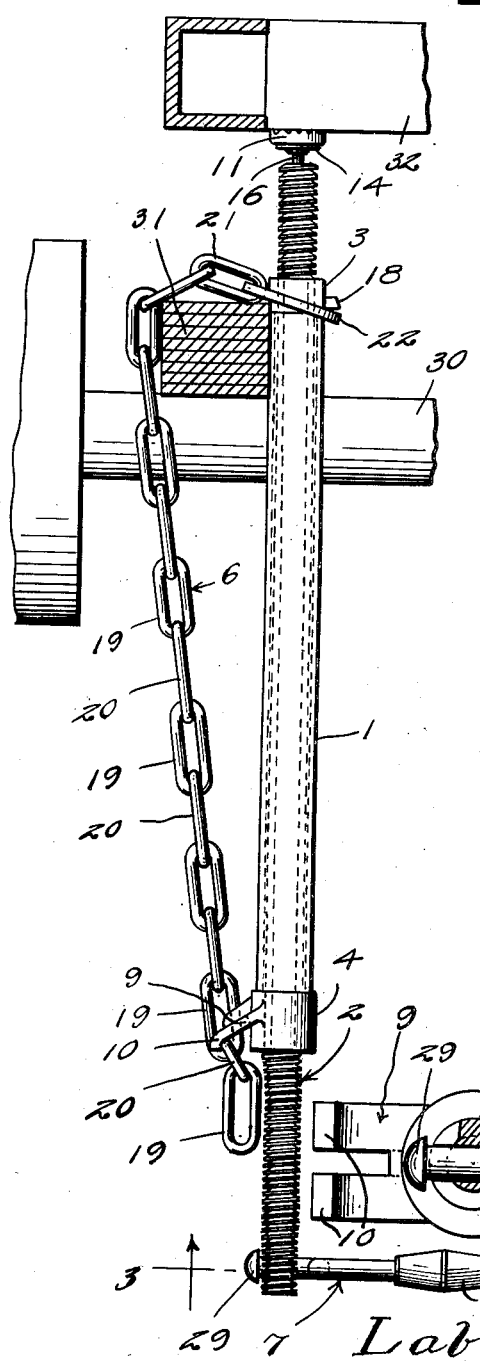
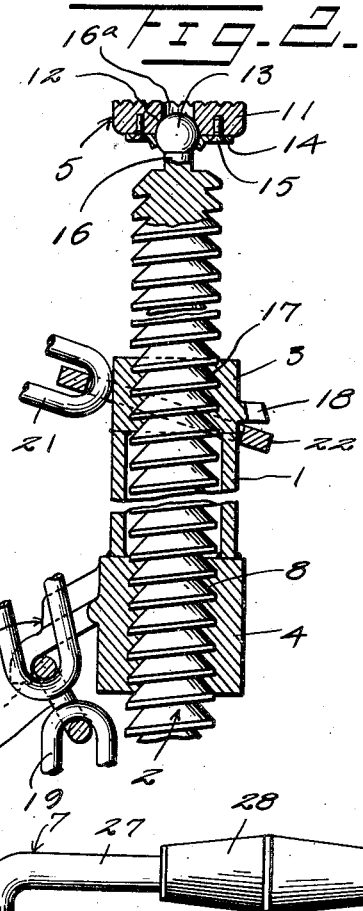
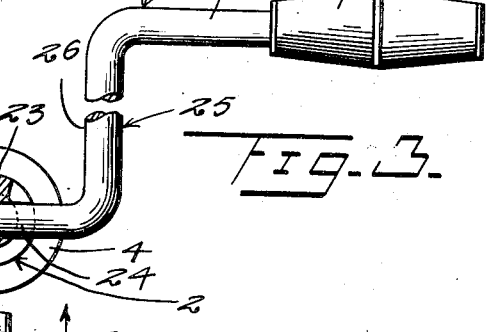
Inventor
Laban B. Kimbrell
By Kimmel & Crowell
Attorneys Patented Jan. 30, 1940

2,188,838

UNITED STATES PATENT OFFICE 2,188,838

LIFTING JACK

Laban B. Kimbrell, Phoenix, Ariz.

Application June 20, 1939, Serial No. 280,194

2 Claims. (Cl. 254—100)

This invention relates to a lifting jack designed primarily for use in the proper lubrication and stabilization of laminated springs employed on all makes of passenger automobiles and light delivery cars, but it is to be understood that a lifting jack, in accordance with this invention is for employment in any connection for which it may be found applicable.

The invention aims to provide, in a manner as hereinafter set forth, a lifting jack capable when installed for use and operated to cause the flat contact surfaces of the laminations of a laminated vehicle spring to separate, spread and be exposed whereby the spring may be expeditiously lubricated directly between its laminations.

The invention further aims to provide, when installed and operated, to relieve the pressure of weight on spring shackle bolts so that, if removal of a spring shackle bolt is necessary, it may be accomplished with greater expediency.

The invention further aims to provide, when installed and operated to relieve the pressure of weight on spring shackle bolts whereby the entrance of a lubricant around the bolts is materially aided.

The invention further aims to provide, in a manner as hereinafter set forth, a lifting jack capable when installed for use and operated to act in a manner on the flat contact or friction surface of each lamination of a laminated vehicle spring to separate and be exposed, whereby the lubricant, instead of tending to be forced between a canvas liner and a spring cover, is forced directly between the laminations of the spring, where they have been moved by the act of the jack to separated relation, with great ease and with superior results to those portions of the laminations which have previously been dry and rusted to thereby stabilize the spring, as such conditions of the laminations in a majority of cases is the primary and basic cause of hard riding and annoying squeaks with other accompanying and oftentimes more serious and expensive troubles.

The invention further aims to provide in a manner as hereinafter set forth, a lifting jack capable when installed for use and operated to act in a manner on the flat contact or friction surface of each lamination of a laminated and grooved transverse spring to separate and be exposed, whereby the lubricant injected through a fitting at the center of the same transverse grooved spring will have a tendency, actuated by the laminations being separated and exposed to penetrate along and through the grooves to the outer ends of each lamination instead of being forced from the spring near its center when the lifting jack is not applied for the purpose for which it is intended.

The invention further aims to provide, in a manner as hereinafter set forth, a lifting jack adapted when used to provide for the expeditious and satisfactorily lubricating of a vehicle spring of the laminated type to stabilize the latter.

The invention further aims to provide, in a manner as hereinafter set forth, a lifting jack for the purpose referred to which is comparatively simple in its construction and arrangement, strong, durable, easily handled and arranged in position for use, readily assembled, thoroughly efficient in its use, and comparatively inexpensive to manufacture.

Embodying the aims aforesaid and others which may hereinafter appear, the invention consists of the novel construction, combination and arrangement of parts as will be more specifically described and illustrated in the accompanying drawing, wherein is shown an embodiment of the invention, but it is to be understood that changes, variations and modifications may be resorted to which fall within the scope of the invention as claimed.

In the drawing:

Figure 1 is a fragmentary view partly in section and side elevation of that portion of a vehicle illustrating the chassis or frame, the rear axle housing and rear frame and showing the adaptation therewith, when in position for use, a lifting jack in accordance with this invention. The jack is illustrated in side elevation, Figure 2 is a fragmentary view, upon an enlarged scale and in vertical section of the lifting jack, and Figure 3 is a section on line 3—3, Figure 1.

A lifting jack in accordance with this invention includes a barrel 1 of the desired diameter and length, a lifting screw 2 of greater length than the length of the barrel 1, an outer or upper interiorly threaded collar 3 which is welded or otherwise secured to the outer or upper end of the barrel 1, an inner or lower interiorly threaded collar 4 which is mounted on, secured to and extended from the inner or lower end terminal portion of the barrel 1, a head element 5 secured to the outer or upper end of the screw 2, a coupling chain 6 of the link-like form for connecting the jack to the vehicle when the jack is to be used, and a handle element 7 connected to and employed for rotating the screw 2.

The barrel 1 preferably will consist of a one inch seamless steel pipe of a desirable length, but it is to be understood that the diameter of the barrel may be as desired. Preferably the screw 2 will be 28 inches and of a diameter relative to the inner diameter of the barrel 1 to freely move lengthwise of the latter when travelling in opposite directions relative to the barrel 1.

The collar 4 is welded or otherwise connected to the inner or lower end of the barrel 1, that is to say it may be mounted on and secured to the inner terminal portion of the barrel 1 or it may be connected or welded to the inner or lower end of the barrel 1. The collar 4 throughout its inner face is threaded, as at 8 for engagement with the threads of the screw 2. The body of the collar 4 will be of greater thickness than the body of the barrel 1. The collar 4 has extended therefrom a slotted latching member 9 which is disposed at an inclination with respect to the collar 4 and has a downwardly extending bill 10 at its outer end.

The head element 5 is formed of an abutment member 11 having a universal joint connection therebetween and the outer or upper end of the screw 2. The universal joint connection consists of a globular recess 12 opening at the bottom of the member 11, a spherical part 13 which is loosely mounted in the recess 12, an axially apertured flanged retaining plate 14 for the part 13 secured by the holdfast devices 15 against the lower face of the member 11, and a stem 16 integral with the part 13 and also integral with the outer or upper end of the screw 2 axially thereof. This abutment member is axially apertured, by means of a hole 16ᵃ of a diameter smaller than the diameter of the globular recess 12 into the top of the globular recess 12. This aperture accommodates and receives the heads of rivets and either end of bolts projecting from a frame, aiding and allowing the lifting jack to be more safely used at an angle without unnecessary danger of slipping. This aperture also allows lubricant to be easily applied to the spherical part 13, making the head element 5 easily adjustable, by pressure of contact, to any angle or surface of frame. It is to be understood that such aperture may be disposed to open into a side of the recess 13 directly opposite the stem 16.

A collar 3 has its inner or lower end connected to or welded to the outer or upper end of the barrel 1 and it is formed with interior threads 17 for engagement with the threads of the lifting screw 2. The thickness of the body of the collar 3 is greater than the thickness of the barrel 1. The collar 3 forms a continuation of the barrel 1. The outer periphery of the collar 3 has formed integral therewith a laterally extending stop lug 18.

The oppositely disposed links of the chain 6 are indicated at 18, 19 and it is well known the alternate links of the chain are disposed at right angles to the other links of the chain. The upper or outer link 21 of the chain 6 has connected to its free end a ring 22 for correlation with the stop lug 18 and when so correlated the ring 22 encompasses the barrel 1 to engage the lug 18.

The inner or lower portion of the chain 6, when the jack is to be used is connected with the barrel 1 by the latching member 9 and in this connection a link 19 of the chain 6 will be extended through the slot in the latching member 9 and that link 20 directly below such link 19 will abut against the inner face of the bill 10 whereby the inner portion of the chain will be connected with the barrel.

The screw 2 in proximity to its inner or lower end is provided with a diametrically disposed opening 23 through which extends the inner portion 24 of the handle element 7. The latter includes a shank 25 of which the portion 24 is a part thereof. The shank 25 includes a portion 26 disposed at right angles to the portion 24 and a portion 27 disposed at right angles to the portion 26 and formed with a hand grip 28. The portions 24, 27 extend in opposite directions with respect to the ends of the portion 26. The portion 24 is slidably mounted in the opening 23 and has its outer or free end provided with a head 29 which couples in connection with the portion 26 the shank 25 to the screw 2.

With reference to Figure 1 the rear axle housing of the vehicle is indicated at 30, a laminated rear vehicle spring 31 and the chassis of the vehicle is indicated at 32. Figure 1 further illustrates one manner in which the lifting jack is coupled to the vehicle in suspended relation with respect to the rear axle. In the manner as shown, the ring 22 bears against the lower face of stop 18 and is disposed in encompassing relation with respect to the outer or upper end terminal portion of the barrel, as well as in encompassing relation with respect to the collar 3.

With further reference to Figure 1, the use for which the lifting jack is conceived is equally applicable, not only to the rear axle and its springs, but also to the front axle and its springs. It is to be further noted that, when the lifting jack is in use on a front axle for the purpose for which it is conceived, it is possible to couple the lifting jack to the center of the front axle and, with the head element 5 placed against the lower or bottom surface of the center of a cross member nearly or directly overhead, the laminations of both left and right springs, or left and right sections of a transverse spring, may be separated in relation to each other at the same time.

The lifting jack may be connected to the vehicle in a manner as shown in Figure 1 or the jack can be placed against the chassis near the spring and the chain dropped over the opposite side of the housing and then hooked to the barrel 1. The lifting jack can also be placed against a front axle near the spring and the chain dropped over the opposite side of the same axle and then hooked to barrel 1. When the jack is arranged in any one of the positions stated, the chassis may be raised sufficiently to take most of the weight off the spring which is on the same side of the chassis as that on which the jack is being used. This is accomplished by turning the screw by means of the handle and which in turn builds up pressure between the spring and the frame, which balances the weight of the chassis on the side on which the jack is being used. This allows the flat contact and/or friction surfaces of each individual lamination to be separated and exposed. Vehicle springs having metal spring covers are definitely benefited during the lubrication process through spreading the laminations by the aforesaid method. The lubricant, instead of tending to be forced between the canvas liner and spring cover actually is forced between the laminations where it is intended to penetrate. Lubricants of any type may be made to penetrate, with great ease and with superior results to those portions of the laminations which have previously been dry and have rusted, and in the majority of cases the dry and rusted portions of the laminations are the primary basic cause of hard riding and annoying squeaks with other accompanying and oftentimes more serious and expensive troubles.

What I claim is:

1. In a lifting jack, a barrel, internally threaded outer and inner collars secured respectively to the outer and inner ends of said barrel, a rotatable lifting screw extending through said barrel and collars and threadedly engaging with the threads on the inner face of said collars, a coupling chain including a ring for encompassing the outer end of the barrel, a stop on the outer periphery of the outer collar for correlation with said ring, means carried by the inner collar and coacting with parts of the chain for connecting the latter with the barrel, an abutment member, means for universally connecting said member to the outer end of the screw, and a handle connected to the inner end of the screw.

2. In a lifting jack, a pair of spaced aligned collars formed with internal threads, a tubular carrier for, arranged between and having its ends connected to said collars, a rotatable lifting screw extending through said carrier and collars and threadedly engaging with the threads of the collars, a slidable ring encompassing said carrier, a stop lug on one of said collars for arresting the sliding movement of said ring, a chain connected at one end to said ring whereby the chain is coupled with the carrier, and a latching member on said other collar and coacting with parts of the chain for connecting the other end of the latter with said carrier.

LABAN B. KIMBRELL.